(12) United States Patent
Wolf et al.

(10) Patent No.: US 10,677,076 B2
(45) Date of Patent: Jun. 9, 2020

(54) GUIDE VANE RING FOR A TURBOMACHINE

(71) Applicant: MTU Aero Engines AG, Munich (DE)

(72) Inventors: Hannes Wolf, Mammendorf (DE); Alexander Halcoussis, Haimhausen (DE)

(73) Assignee: MTU AERO ENGINES AG, Munich (DE)

( * ) Notice: Subject to any disclaimer, the term of this patent is extended or adjusted under 35 U.S.C. 154(b) by 264 days.

(21) Appl. No.: 15/497,902

(22) Filed: Apr. 26, 2017

(65) Prior Publication Data
US 2017/0314406 A1    Nov. 2, 2017

(30) Foreign Application Priority Data

Apr. 28, 2016 (DE) .................. 10 2016 207 212

(51) Int. Cl.
*F01D 9/04* (2006.01)
*F01D 17/16* (2006.01)
*F04D 29/54* (2006.01)
*F04D 29/56* (2006.01)

(52) U.S. Cl.
CPC .......... *F01D 9/041* (2013.01); *F01D 17/162* (2013.01); *F04D 29/542* (2013.01); *F04D 29/563* (2013.01); *F05D 2220/32* (2013.01); *F05D 2250/61* (2013.01); *F05D 2250/711* (2013.01); *F05D 2250/712* (2013.01)

(58) Field of Classification Search
None
See application file for complete search history.

(56) References Cited

U.S. PATENT DOCUMENTS

| | | | |
|---|---|---|---|
| 5,796,199 A * | 8/1998 | Charbonnel | F01D 17/162 310/60 A |
| 6,688,846 B2 | 2/2004 | Caubet et al. | |
| 7,802,963 B2 * | 9/2010 | Holland | F01D 9/042 415/148 |
| 8,511,978 B2 | 8/2013 | Allen-Bradley et al. | |
| 8,721,269 B2 | 5/2014 | Abadie et al. | |

(Continued)

FOREIGN PATENT DOCUMENTS

| | | |
|---|---|---|
| DE | 102013222980 | 6/2015 |
| EP | 1188933 | 3/2002 |

(Continued)

*Primary Examiner* — Igor Kershteyn
*Assistant Examiner* — Juan G Flores
(74) *Attorney, Agent, or Firm* — Davidson, Davidson & Kappel, LLC

(57) ABSTRACT

A guide vane ring for a turbomachine minimizes a leakage flow that passes through a recess into which a guide vane disk is inserted. It has a guide vane row having a plurality of guide vanes, each having a vane airfoil and a vane disk, as well as an inner ring having an inner ring surface facing the plurality of guide vanes. Viewed in the direction of a designated primary flow streaming through the turbomachine, the vane disks have a front and a rear surface region. In a nominal and/or a maximum open position of the guide vanes, the front and/or the rear surface region of at least one of the vane disks has an offset from the inner ring surface that is radially disposed (relative to a central axis of the inner ring).

18 Claims, 2 Drawing Sheets

(56) References Cited

U.S. PATENT DOCUMENTS

| | | | |
|---|---|---|---|
| 8,734,088 B2 * | 5/2014 | Jones | F01D 17/162 |
| | | | 415/115 |
| 9,085,985 B2 | 7/2015 | Barr et al. | |
| 2010/0143139 A1 | 6/2010 | Pandey et al. | |
| 2010/0158696 A1 | 6/2010 | Pandey et al. | |
| 2013/0011265 A1 | 1/2013 | Miller et al. | |
| 2013/0216359 A1 | 8/2013 | Brandenburg et al. | |
| 2015/0192025 A1 | 7/2015 | Boeck | |

FOREIGN PATENT DOCUMENTS

| | | |
|---|---|---|
| EP | 2591213 | 5/2013 |
| EP | 2884054 | 6/2015 |
| WO | WO2010/079204 | 7/2010 |
| WO | WO2013/009449 | 1/2013 |
| WO | WO2014/130214 | 8/2014 |
| WO | WO2015/076961 | 5/2015 |

\* cited by examiner

GUIDE VANE RING FOR A TURBOMACHINE

This claims the benefit of German Patent Application DE 102016207212.9, filed Apr. 28, 2016 and hereby incorporated by reference herein.

The present invention relates to a guide vane ring having an inner ring and a plurality of guide vanes, an assembly for a guide vane ring, and a turbomachine having a guide vane ring.

BACKGROUND

Turbomachines, such as aircraft engines and stationary gas turbines, normally have at least one compressor-side and/or one turbine-side guide vane row having a multiplicity of guide vanes. Together with an inner ring, the guide vane row forms what is generally referred to as a guide vane ring. To set optimal operating conditions, the guide vanes are thereby preferably pivotably mounted about the longitudinal axis thereof and may thereby assume different rotational positions. In this case, one also speaks of variable guide vanes.

In the radial direction, the inner ring preferably has a plurality of recesses, into each of which a disk of a guide vane is inserted. Positioning pins of the guide vanes, that can cooperate with a corresponding adjusting device on the outer casing, can be used for a radially outer mounting of the guide vanes, as well as for the actuation thereof. Disposed on inner ring is preferably a seal carrier that is provided with sealing elements or abradable coatings, which are located opposite the sealing ribs of the rotor.

During operation, air enters into the gap between the walls of the recesses in the inner ring and the vane disk inserted in each case, at the pressure side of the vane airfoil on the rear side (in the primary flow direction) of the inner ring, and emerges again at the suction side of the vane airfoil on the front side (in the primary flow direction) of the inner ring. The vortices formed by this leakage have a negative effect on the primary air flow and thus on the efficiency of the turbomachine.

SUMMARY OF THE INVENTION

It is an object of the present invention to provide a guide vane ring, respectively a turbomachine that will reduce the leakage between the inner ring and an inserted guide vane.

The present invention provides a guide vane ring, an assembly for a guide vane ring, and a turbomachine. Advantageous specific embodiments are described in the specification, and the figures.

An inventive guide vane ring for a turbomachine has a guide vane row having a plurality of pivotably mounted guide vanes, as well as an inner ring having an inner ring surface facing the plurality of guide vanes. The guide vanes each have a vane airfoil and a vane disk. In a nominal and/or in a maximum open position of the guide vanes, the vane disks (at the side thereof facing the vane airfoil) have a front and a rear surface region, viewed in the direction of a designated primary flow streaming through the turbomachine; the front and/or the rear surface region of at least one of the vane disks thereby feature(s) an offset from the inner ring surface, the offset being radially disposed (relative to a central axis of the inner ring).

A "nominal open position" is to be thereby understood as a rotational position of the guide vanes where, for two points, which are diametrically opposed on the rim of the guide-vane disk surface relative to the longitudinal axis of the vane airfoil, about which the guide vane is pivotably mounted, and thereby reside in a plane common to the central axis of the inner ring, a maximum possible difference is attained in the distances of the points to the inner ring's central axis. In the normal installed state, this central axis coincides with the axis of rotation, respectively the machine axis of the turbomachine.

Thus, among all the possible rotational positions of the guide vanes and those of diametrically opposed (relative to the vane disk) boundary points p, q of the vane disk that reside (in the particular rotational position) in a (meridian) plane that is common to central axis X of the inner ring of the guide vane ring, a maximum difference of $$U(p,q)=|\text{dist}(p,X)-\text{dist}(q,X)|$$

between distances dist(p, X) and dist(q, X) of the two points, in each case from central axis X of the inner ring, is derived for the nominal open position. As is customary for the distances between points and straight lines, these distances are the perpendicular lengths from the points to central axis X, respectively. There are actually two rotational positions of the guide vanes to which this condition applies; the intention here being to only consider that rotational position as "nominal open position" at which the front edge of the vane airfoil of the guide vane is situated upstream from the longitudinal axis of the vane airfoil, and a rear edge of the guide vane's airfoil is situated correspondingly downstream from the longitudinal axis of the vane airfoil, in each case relative to the main direction of flow in the turbomachine.

In a turbomachine, such a nominal open position is preferably adjusted when the speed of the turbomachine is the speed it is designed to operate at. For example, (as a turbomachine) an aircraft engine may be designed for what is generally referred to as a "cruise mode," namely for a specific cruising velocity at a specific cruising altitude.

A maximum open position may be adjusted, for example, when the primary flow through the vane airfoil undergoes a minimal change in direction (in comparison with a guide vane that is pivoted relative thereto). Such a maximum open position may be adjusted at a start of an aircraft engine (as a turbomachine), for example.

Thus, the inner ring surface facing the guide vanes and the surface of the vane disk (facing the corresponding vane airfoil thereof and thus likewise the guide vanes) do not extend along a shared, smooth surface; rather, the front and/or the rear surface region of the vane disk surface are/is offset from the inner ring surface, so that a step that is radially raised or lowered (relative to the central axis of the inner ring) is formed at an offset point between the surfaces in question.

It is thus possible to reduce an air flow in the gap between the vane disk and the inner ring in the recess and thereby decrease leakage. The surge line of the turbomachine and the efficiency thereof may be thereby improved.

An assembly according to the present invention for a guide vane ring includes an inner ring and at least one guide vane that is insertable into a recess of the inner ring. The guide vane disk includes a front and a rear surface region— viewed in the direction of a designated primary flow streaming through the turbomachine. Functionally combined, an inventive assembly yields a guide vane ring according to the present invention in accordance with the specific embodiments described in this document.

An inventive turbomachine has an inventive guide vane ring in accordance with one of the specific embodiments described in this document.

One advantageous specific embodiment of the present invention provides that the surface region of the vane disk be recessed relative to the inner ring surface (in the nominal and/or maximum open position of the guide vane). In particular, in this specific embodiment, the front surface region of the vane disk (facing the vane airfoil) is preferably sunk in a recess of the inner ring surrounding the vane disk.

An air flow entering into the turbomachine is thereby advantageously directed past the front surface region, so that air emerging from the gap is decelerated in this region before being mixed with the primary flow. At the same time, this reduces the effect of air being suctioned into the gap between the vane disk and the inner ring (in the recess thereof) in the rear surface region of the vane disk. The leakage air flow is thus altogether decreased.

Alternatively or additionally, one advantageous specific embodiment provides that the rear surface region of the vane disk be raised in comparison with the inner ring surface (in the nominal and/or maximum open position of the guide vane). In particular, in this specific embodiment, the rear surface region of the vane disk preferably projects out of a recess of the inner ring surrounding the vane disk, into the primary flow, for example.

Thus, a primary flow that enters into the turbomachine is advantageously directed past the gap between the rear surface region of the vane disk and the inner ring. This lessens an inflow of air into the gap.

Specific embodiments are advantageous where the offset of the front and/or rear surface region, relative to the inner ring surface—in particular in the case of a nominal and/or maximum open position of the guide vane—has a (step) height of between 1 mm and 4 mm (as an absolute, thus unsigned value) and/or of 3% to 15%, preferably 5% to 10% of the diameter of the vane disk or of a channel height (respectively, of a radius of the guide vane ring). The offset height may thereby be measured parallel to the guide vane axis (respectively, radially relative to the inner ring) and preferably at the maximum thereof. These dimensions are particularly beneficial, on the one hand, for directing the primary flow into the turbomachine and, on the other hand, for reducing leakage, as described. Laterally of the maximum points, the offset preferably flattens continuously.

To the extent that the two mentioned surface regions of the vane airfoil form an offset to the inner ring surface, the (step) heights in question may be the same or different (as absolute, thus unsigned values). Thus, the offsets may be adapted to the flow guidance produced by the inner ring surface.

This keeps any influencing of the primary flow in the area of the vane disk to a relative minimum, and thereby decreases the leakage flow predominantly by slowing down the air that emerges from the gap in the front surface region; this slowing down, in turn, advantageously reduces the effect of suctioning into the gap in the rear surface region.

Analogously, it may be advantageous when an offset is formed at the front surface region of the vane disk in the manner mentioned; however, when the vane disk extends in the rear surface region essentially steplessly to the inner ring surface.

At the side facing the vane airfoil, the vane disk may have an essentially plane surface, an essentially convex, an essentially concave or a corrugated surface (preferably having at least one concave and convex section). Thus, the vane disk may be adapted to the inner ring surface and thereby suitably direct the primary flow over the offset between the front, respectively rear surface region and inner ring surface.

BRIEF DESCRIPTION OF THE DRAWINGS

A preferred exemplary embodiment of the present invention and, as a comparison, a detail view of a related-art guide vane ring are explained in greater detail in the following with reference to the drawing. It is understood that different combinations of individual elements and components are possible other than those explained.

Schematically shown in.

DETAILED DESCRIPTION

Figure 1:
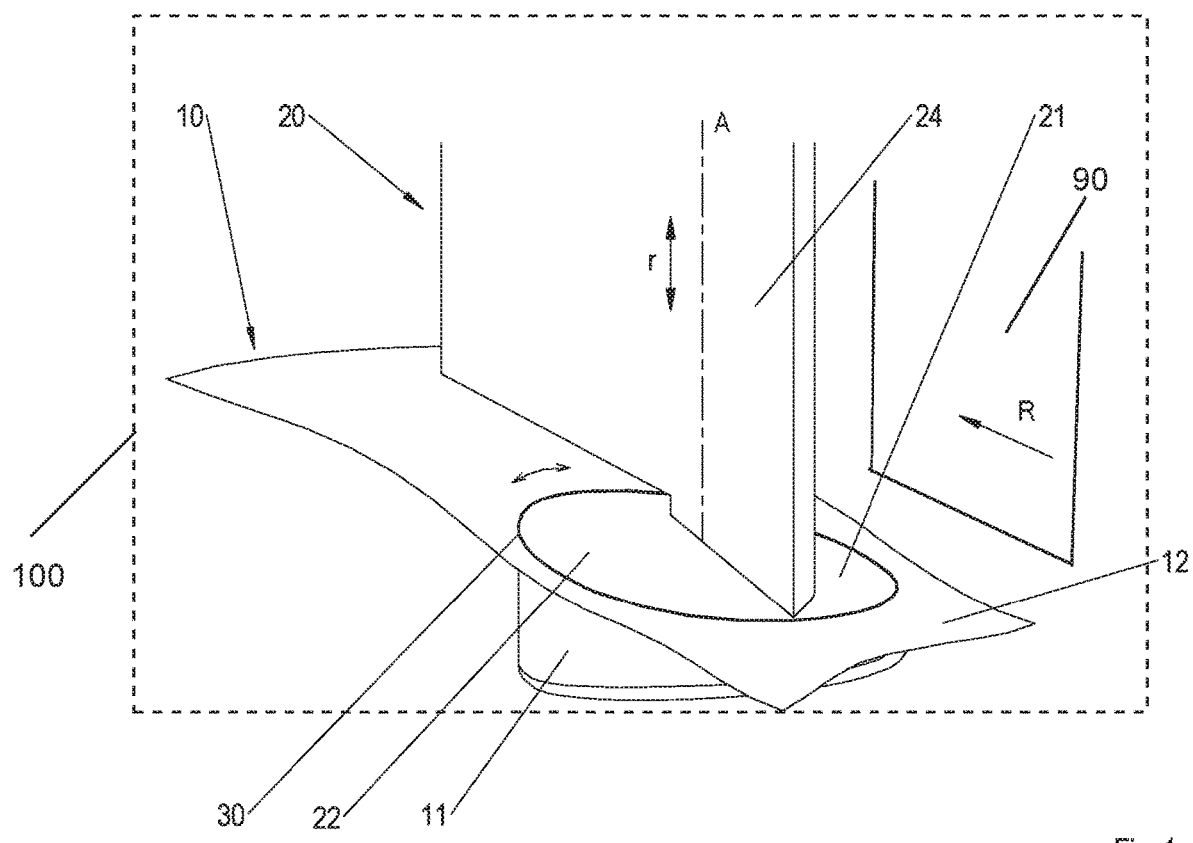
FIG. 1: is a portion of a guide vane ring in accordance with the related art.

FIG. 1 shows a portion of a conventional guide vane ring. The portion includes a section of an inner ring 10 having a recess 11 into which a vane disk 21 of a guide vane 20 is inserted. Besides vane disk 21, guide vane 20 includes a vane airfoil 24. Pivotably mounted about longitudinal axis A thereof, which extends in radial direction r relative to the inner ring (respectively, to central axis thereof), is the guide vane. In the representation of FIG. 1, guide vane 20 is in a nominal open position. A designated primary flow streams in a direction R. A plurality of similar guide vanes are spaced circumferentially about the central axis, shown schematically by guide vane 90, which thus forms a ring of a turbomachine also shown schematically as 100.

Facing guide vane 20, respectively vane airfoil 24 thereof (and thus facing away from a central axis of the inner ring) are an inner ring surface 12 and a surface 22 of the vane disk. Both together reside along a smooth surface and are essentially steplessly mutually separated only by a gap 30.

Figure 2:
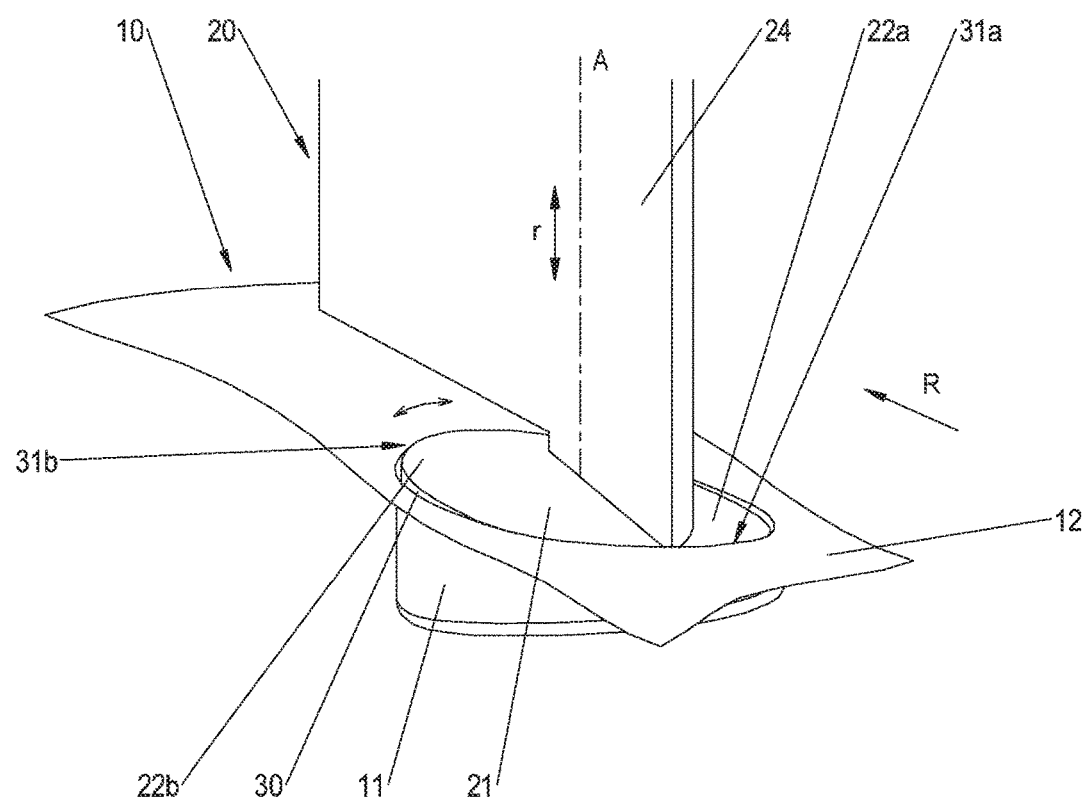
FIG. 2: is a portion of a guide vane ring in accordance with a specific embodiment of the present invention; and in FIG. 3: a cross-sectional view of a guide vane ring in accordance with a specific embodiment of the present invention.

In an analogous representation, FIG. 2 shows a portion of an inventive guide vane ring; elements, which correspond to those of guide vane ring shown in FIG. 1, are each provided with the same reference numerals; for the description thereof, reference is made to that of FIG. 1.

In the specific embodiment shown in FIG. 2, surface 21 of guide vane 20 features a front surface region 22a and a rear surface region 22b (viewed relative to designated primary flow direction R). In the illustrated exemplary embodiment, the two surface regions 22a, 22b (in the illustrated nominal open position of the guide vanes) form an offset 31a, respectively 31b that is radially disposed (relative to the central axis of the inner ring) to inner ring surface 12 at gap 30. In comparison to inner ring surface 12, front surface region 22a is sunken (respectively into the recess for the vane disk); and rear surface region 22b is raised relative to inner ring surface 12 (thus, projects out of the recess for the vane disk).

Offset 31a decelerates the mixing of a leakage flow, which emerges in this region through gap 30, with the primary flow. This also minimizes a harmful influence on the primary flow, and additionally reduces the effect of air being suctioned into the gap that occurs between rear surface region 22b and inner ring surface 12, in particular.

In addition, offset 31b reduces the ingress of air into gap 30 in this area because it directs the primary flow past the gap.

Thus, the leakage flow is altogether minimized.

Figure 3:
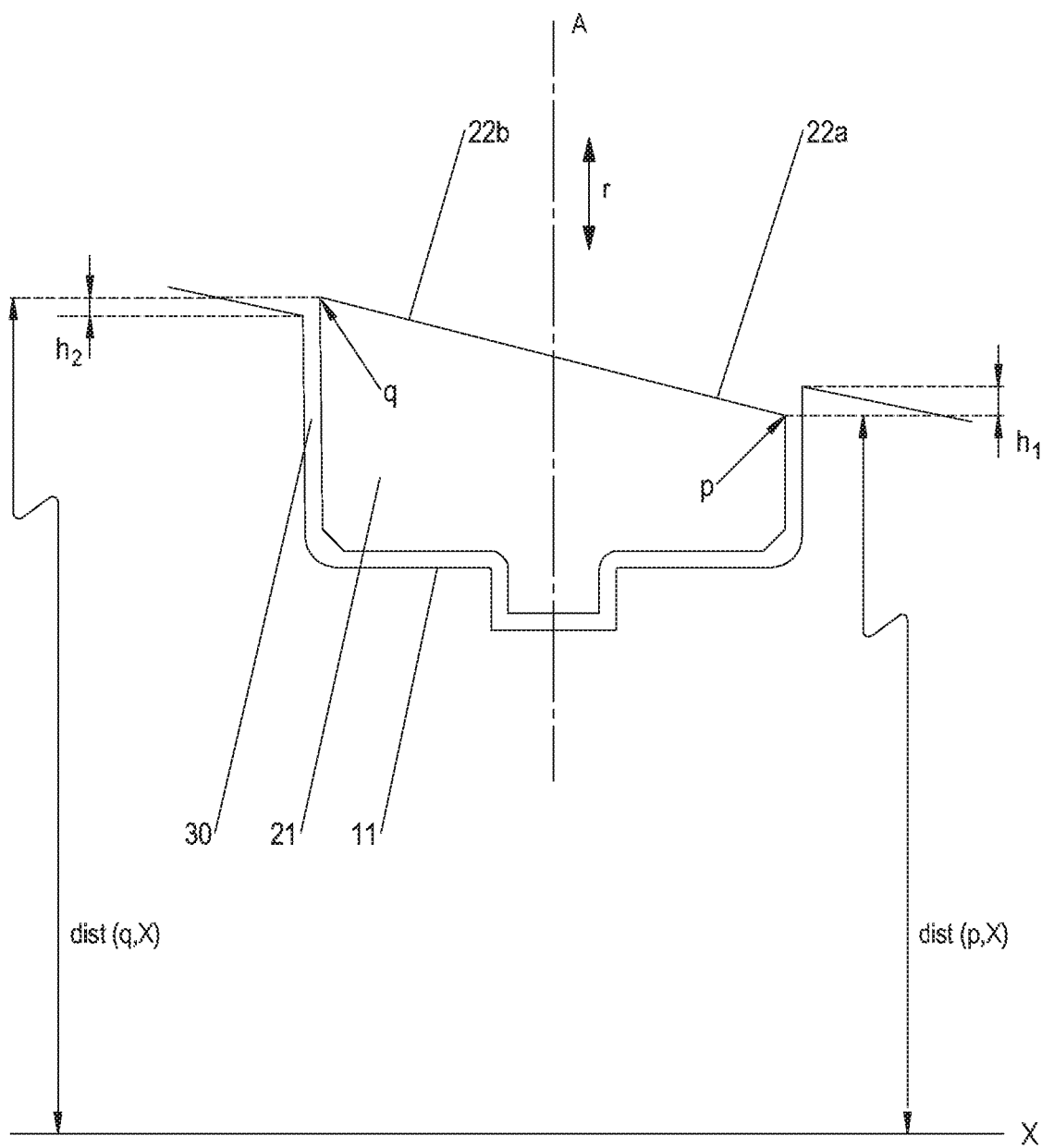

In a cross-sectional view, FIG. 3 shows a guide vane ring in accordance with a specific embodiment of the present invention. The elements already described with reference to FIGS. 1 and 2, are provided, in turn, with the same reference numerals, and, for the description thereof, reference is made to the above explanations.

Vane disk 21 is shown in FIG. 3 in the nominal open position of the corresponding guide vane. To illustrate this open position, central axis X of guide vane ring, points p and q and distances dist(p,X), respectively dist(q,X) thereof to central axis X are drawn in the figure (not true-to-scale); points p,q each reside on the rim of the surface of vane disk 21 and in diametrical opposition relative to longitudinal axis A of the vane airfoil about which the guide vane is pivotably mounted, and, in fact, in a common meridian plane of central axis X. In the illustrated nominal open position, difference $U(p,q)=|dist(p, X)-dist(q, X)|$ (in terms of absolute value) is at a maximum of all possible guide vane settings. Thus, rotating the guide vanes, two other points (not shown here), p', q' are configured at the corresponding positions (in particular, likewise diametrically opposed and shown in the same meridian plane as FIG. 3); then the difference in the distance of these points p', q' from central axis X of the inner ring is smaller than that of points p and q.

As is also discernible in FIG. 3, the offset between point p (in front surface region 22a of vane disk 21) and the inner ring surface (relative to the inner ring) has a step height $h_1$ in radial direction r; the absolute, thus the unsigned value being considered.

Diametrically opposite point p, an offset between rear surface region 22b of vane disk 21 and inner ring surface is discernible in point q. In radial direction r (relative to the inner ring), this offset has a step height $h_2$.

Heights $h_1$ and $h_2$ are preferably each within a range of 3% to 15% of the diameter of the vane disk, more preferably within a range of 5% to 10% of the diameter of the vane disk. Heights $h_1$ and $h_2$ are advantageously between 1 mm and 4 mm, preferably between 1.5 and 2.5 mm. In the illustrated example, height $h_1$ is greater than height $h_2$, so that the present invention reduces the leakage flow passing through the recess, especially because of the reduced mixing in front surface region 22a of the vane disk and the resulting lessened effect of air being suctioned into gap 30; and the surface of the vane disk (particularly in rear surface region 22b) keeps the deflection of the primary flow to a minimum.

The vane disk has an essentially plane surface in the illustrated specific embodiment. In alternative specific embodiments, the surface of the vane disk (at least in one or a plurality of section(s)) may be curved convexly (toward the vane disk) or concavely (away from the vane disk) or have a corrugated surface (for example, featuring a sinusoidal cross section); and/or the front and the rear surface region may reside on different planes. The vane disk surface may be thereby adapted to inner ring surface 22.

An inventive guide vane ring for a turbomachine minimizes a leakage flow that passes through a recess 11 in which a guide vane disk is inserted. The guide vane ring has a guide vane row having a plurality of guide vanes 20, each having a vane airfoil 24 and a vane disk 21, as well as an inner ring 10 having an inner ring surface 12 facing the plurality of guide vanes. Viewed in direction R of a designated primary flow streaming through the turbomachine, vane disks 21 have a front and a rear surface region 22a, 22b. In a nominal and/or a maximum open position of the guide vanes, front and/or rear surface region 22a, 22b of at least one of the vane disks has an offset 31a, 31b from inner ring surface 12 that is radially disposed (relative to a central axis X of the inner ring).

REFERENCE NUMERAL LIST 10 inner ring
11 recess
12 inner ring surface
20 guide vane
21 vane disk
22 vane disk surface
22a front surface region
22b rear surface region
24 vane airfoil
30 gap
31a, 31b offset
90 guide vane
100 turbomachine
A longitudinal axis of the vane airfoil
$h_1$, $h_2$ height of the offset
p, q diametrically opposed points on the rim of the vane disk that reside in a meridian plane that is common to the axis of rotation
r radial direction (relative to the inner ring)
R primary flow direction
X central axis of the inner ring (respectively, of the machine axis of the turbomachine)

What is claimed is:

1. A guide vane ring for a turbomachine, the guide vane ring comprising:
   a guide vane row having a plurality of pivotably mounted guide vanes, each having a vane airfoil and a vane disk;
   an inner ring having an inner ring surface facing the plurality of pivotably mounted guide vanes;
   viewed in a direction of a designated primary flow streaming through the turbomachine, the vane disks having a front and a rear surface region, wherein, in a nominal or a maximum open position of the plurality of pivotably mounted guide vanes, the front or rear surface region of at least one of the vane disks has an offset from the inner ring surface radially disposed relative to a central axis of the inner ring;
   wherein the one of the front and rear surface regions is raised with respect to a plane of the inner ring surface, and the other of the front and rear surfaces is sunken with respect to the plane of the inner ring surface.

2. The guide vane ring as recited in claim 1 wherein the front surface region of the vane disk in the nominal or the maximum open position of the plurality of pivotably mounted guide vanes is sunken relative to the inner ring surface.

3. The guide vane ring as recited in claim 2 wherein the offset between the front surface region and the inner ring surface has a height 3% to 15% of the diameter of the vane disk or of a channel height.

4. The guide vane ring as recited in claim 1 wherein the rear surface region of the vane disk in the maximum open position of the guide vanes is raised relative to the inner ring surface.

5. The guide vane ring as recited in claim 4 wherein the offset between the rear surface region and the inner ring surface has a height 3% to 15% of the diameter of the vane disk or of a channel height.

6. The guide vane ring as recited in claim 1 wherein in the nominal or maximum open position of the plurality of pivotably mounted guide vanes, the front and the rear surface region have an offset of a same height from the inner ring surface.

7. The guide vane ring as recited in claim 1 wherein at a side facing the vane airfoil thereof, the vane disk having a plane, a convex, a concave or a corrugated surface.

8. An assembly for the guide vane ring as recited in claim 1, the assembly having the inner ring and at least one guide vane insertable into a recess of the inner ring.

9. A turbomachine comprising the guide vane ring as recited in claim 1.

10. A guide vane ring for a turbomachine, the guide vane ring comprising:
   a guide vane row having a plurality of pivotably mounted guide vanes, each having a vane airfoil and a vane disk;
   an inner ring having an inner ring surface facing the plurality of pivotably mounted guide vanes and defining an inner ring surface plane;
   viewed in a direction of a designated primary flow streaming through the turbomachine, the vane disks having a surface region defining a surface region plane and a front and a rear surface region, the surface region plane being angled with respect to the inner ring surface plane and crossing the inner ring surface plane so that in a nominal or a maximum open position of the plurality of pivotably mounted guide vanes, the front or rear surface region of at least one of the vane disks has an offset from the inner ring surface radially disposed relative to a central axis of the inner ring.

11. The guide vane ring as recited in claim 10 wherein the front surface region of the vane disk in the nominal or the maximum open position of the plurality of pivotably mounted guide vanes is sunken relative to the inner ring surface.

12. The guide vane ring as recited in claim 11 wherein the offset between the front surface region and the inner ring surface has a height 3% to 15% of the diameter of the vane disk or of a channel height.

13. The guide vane ring as recited in claim 10 wherein the rear surface region of the vane disk in the nominal or the maximum open position of the plurality of pivotably mounted guide vanes is raised relative to the inner ring surface.

14. The guide vane ring as recited in claim 13 wherein the offset between the rear surface region and the inner ring surface has a height 3% to 15% of the diameter of the vane disk or of a channel height.

15. The guide vane ring as recited in claim 10 wherein in the nominal or maximum open position of the plurality of pivotably mounted guide vanes, the front and the rear surface region have an offset of a same height from the inner ring surface.

16. The guide vane ring as recited in claim 10 wherein at a side facing the vane airfoil thereof, the vane disk having a plane, a convex, a concave or a corrugated surface.

17. An assembly for the guide vane ring as recited in claim 10, the assembly having the inner ring and at least one guide vane insertable into a recess of the inner ring.

18. A turbomachine comprising the guide vane ring as recited in claim 10.

* * * * *